Oct. 15, 1929.  F. SAMUEL  1,732,067
TALKING MACHINE
Filed March 8, 1928   2 Sheets-Sheet 1
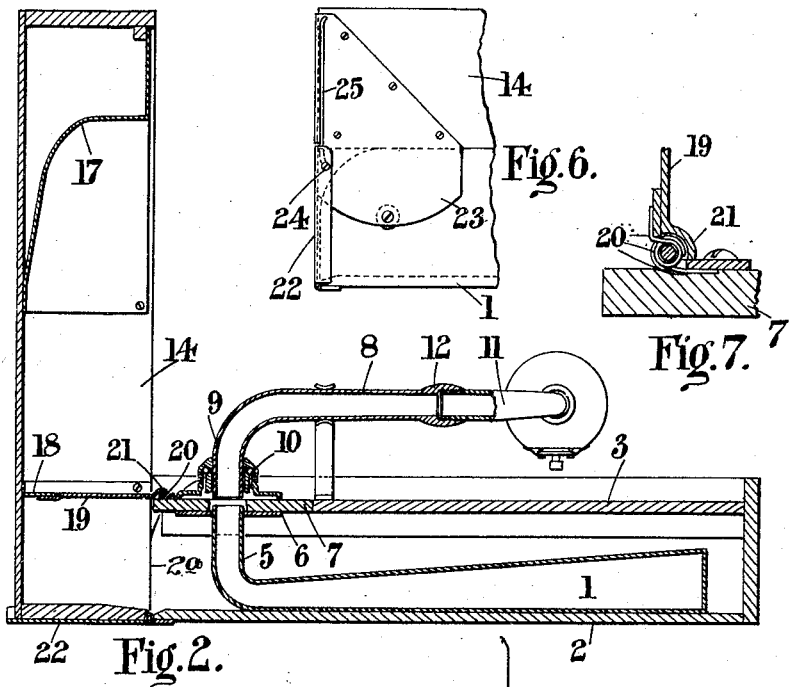
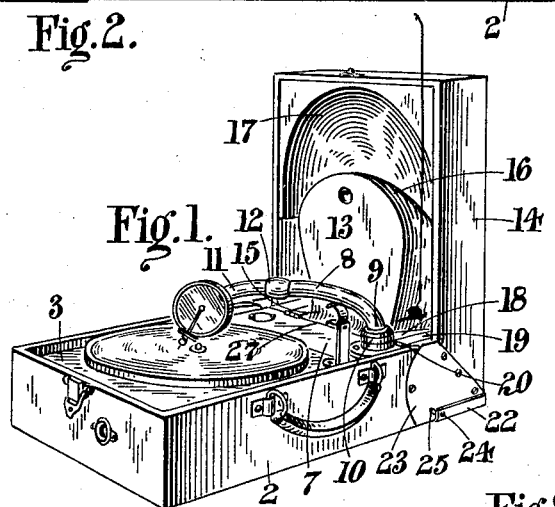
Inventor,
F. SAMUEL Oct. 15, 1929.  F. SAMUEL  1,732,067
TALKING MACHINE
Filed March 8, 1928  2 Sheets-Sheet 2
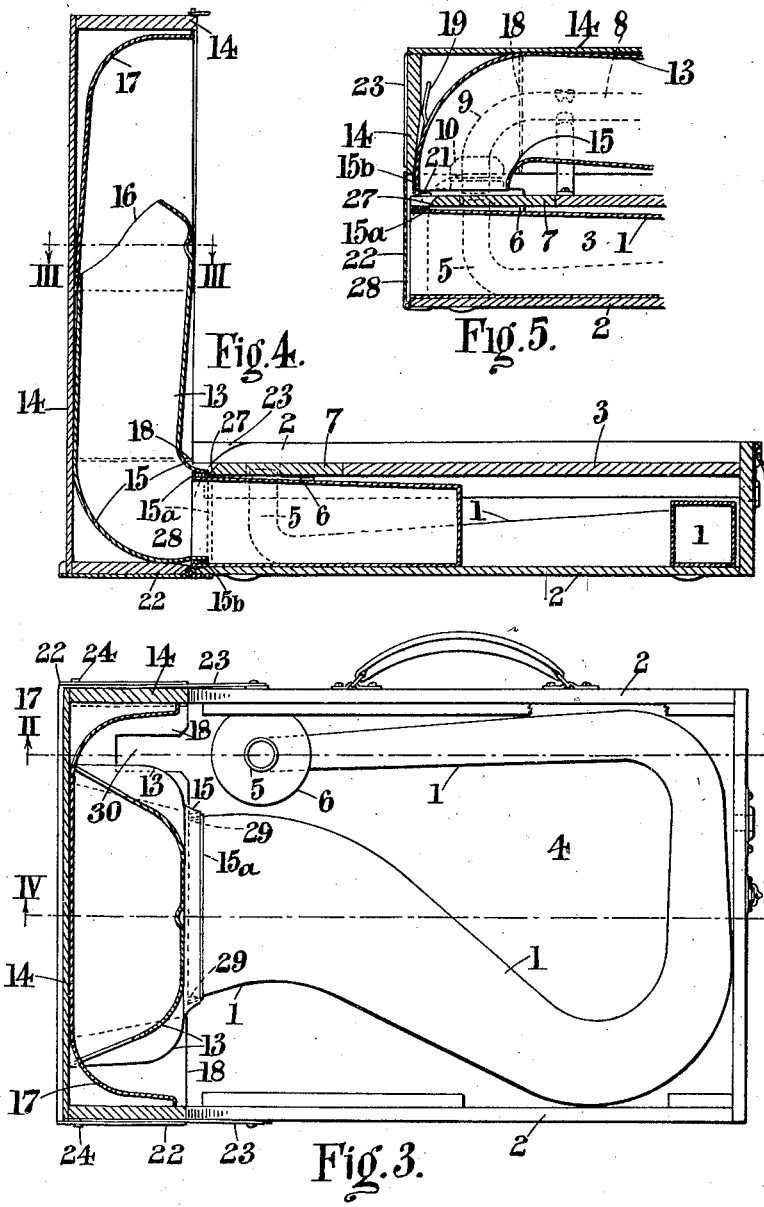

Patented Oct. 15, 1929

1,732,067

UNITED STATES PATENT OFFICE

FRANK SAMUEL, OF LONDON, ENGLAND

TALKING MACHINE

Application filed March 8, 1928, Serial No. 260,202, and in Great Britain April 11, 1927.

This invention relates to portable and other talking machines, which are enclosed within a casing of limited dimensions, and provided with a lid.

In order to enable a sound conduit to be used of practically correct taper and of greater length than has been hitherto possible in talking machines of the above type, the tone arm is connected to a portion of tapering horn which is situated in the casing, for example, below the motor board, and is adapted to be connected at its larger end to a further portion of horn which is situated in the lid and has its flare or mouth directed in any suitable direction, but preferably towards one or more deflecting surfaces in the lid.

The sound conduit is thus composed of three parts, namely, the tone arm, the part within the casing and the part within the lid, and it is thus possible to make the conduit of greater length than usual and practically of correct shape, and, moreover, to effect this in such a manner that the lid can be closed with the parts of the conduit intact, so that the portability or compactness of the instrument is in no way impaired.

In the accompanying drawings illustrating one form of the invention:—

Figure 1 is a perspective view of the complete machine with the lid upright.

Figure 2 is a sectional elevation of the machine with the lid upright, the section being taken on II—II, Figure 3, the motor and turntable being omitted, but the motor board and tone-arm being shown.

Figure 3 is a sectional plan with the motor, turn-table, motor board and tone-arm omitted, the section being taken on III—III, Figure 4.

Figure 4 is a sectional elevation on IV—IV, Figure 3, but showing the motor board, the tone-arm, turn-table and the motor being omitted.

Figure 5 is a similar section of part of the machine shown in Figure 4, but with the lid closed, the position of part of the tone-arm being indicated in dotted lines.

Figure 6 is a side view of a hinge for the lid.

Figures 7 and 8 are two side sectional elevations of a detail.

In the form of the invention illustrated a portion of horn 1, preferably of rectangular cross section and practically of correct taper, is fitted in the casing 2, below the motor board 3, and so curved as to leave a space 4 for the motor. By correct taper is meant the taper which is known in the art as mathematically correct for the proper acoustic results. The smaller end 5 of this portion of horn is bent upwards and provided with a flange 6 abutting against a panel 7. A tone-arm 8 has a downwardly bent portion 9 mounted in a ball-bearing 10 carried on the panel 7, so that the tone-arm forms an extension of the horn. The tone-arm has a swinging neck 11 preferably screwed into a socket 12 on the tone-arm.

A further portion of horn 13 fitted in the lid 14 has a bend 15 shaped to conform to the adjacent larger end of the portion of horn 1 so that it coincides therewith when the lid 14 is raised into an upright position, as shown in Figure 4.

A packing strip 15ª of velvet, leather or other material is preferably provided on the top and two sides of the portion 1 and a similar strip 15ᵇ on the bottom of the portion 15 to ensure a sound tight fit and to avoid undesirable vibration.

The bottom of the portion 15 is also slotted for the reception of the adjacent edges 28 of the two sides of the portion 1, as indicated in dotted lines at 29, Figure 3.

In the drawings the thickness of the material of the sound conduit and of the packing strips is shown somewhat exaggerated for the sake of clearness; with thinner material the portions 1 and 15 may be made to merge into one another to maintain a more correct taper.

The flare or mouth 16 of the portion of horn 13 is preferably curved or directed towards a deflector such as an arched deflector 17 fitted in the lid, and the edge of the panel 7 is bevelled at 27 to allow the part 15 to clear the panel when the lid is being opened and shut.

The complete sound conduit comprising the portions of the tone-arm 8 and 11 and portion of horns 1 and 13 may be of correct taper and longer than hitherto obtainable in portable or other talking machines having casings of equal or like dimensions, and the portability or compactness is in no way impaired.

The lid can be closed with the portion of horn 13 intact as shown in Figure 5.

A plate 18 is preferably fitted in the lid around the lower part of the portion of horn 13.

In order to accommodate the adjacent portion of the tone-arm 8, when the lid is closed, the plate 18 is slotted as indicated at 30 in Figure 3. A flap 19 is preferably provided as shown in Figures 1, 2, 5, 7 and 8 for the purpose of closing the slot 30 when the lid is opened. The flap has a spring hinge 20 which yields when the lid is opened and the flap is thrust backward by the plate 18 into the horizontal position indicated in Figures 2 and 8. As the lid is closed, the flap 19 follows the plate 18 under the action of the spring hinge 20 until a stop 21 on the flap engages with the stationary part of the hinge as shown in Figures 5 and 7 so that the flap is held in a substantially upright position and the slot is clear to receive the adjacent portion of tone-arm.

In the example shown the casing 2 is open at the end to which the lid is hinged as at 2ª, Fig. 2, and when the lid is closed this is closed by a hinged flap 22. The lid is connected to the casing by hinge plates 23. The flap 22 has pins 24 engaging in slots 25 in the plates 23, so that it is opened and closed with the lid.

The manner in which the portion of horn within the lid may be connected to that within the casing and the form of connection between the lid and the casing may be varied to suit the type of casing or other requirements.

While an arched shaped deflector is shown by way of example, other shapes well known in the art may be used instead.

I claim:

A portable talking machine comprising a casing having an open end and fitted with a motor board, a looped portion of tapering horn below said motor board, a tone arm above said motor board and connected to one end of said looped portion of horn, a lid containing an arched deflector and a portion of horn having a flare at one end directed towards said deflector and having its other end situated within the lid and formed as a bend, and hinges connecting said lid to said casing and adapted to allow said lid to be swung about said hinges into an upright position against the said open end of said casing with the bend of the said portion of horn which is within the lid in close engagement with the adjacent end of the said looped portion of horn within the casing.

In testimony whereof I have signed my name to this specification.

FRANK SAMUEL.